3,598,759
Patented Aug. 10, 1971

3,598,759
METHOD FOR IMPROVING THE CRUSHING STRENGTH AND RESISTANCE TO ABRASION OF A CATALYST
Ralph J. Bertolacini, Chesterton, Ind., assignor to Standard Oil Company, Chicago, Ill.
No Drawing. Continuation-in-part of abandoned application Ser. No. 583,407, Sept. 30, 1966. This application Feb. 11, 1969, Ser. No. 798,437
Int. Cl. B01j 11/78
U.S. Cl. 252—442                 7 Claims

ABSTRACT OF THE DISCLOSURE

The method comprises incorporating silica into the catalyst after the catalyst has been formed into desired shapes to form a silica-impregnated catalyst, drying and calcining in air the silica-impregnated catalyst. The silica is impregnated therein to provide an amount between about 1 weight percent and about 20 weight percent, based upon the weight of the catalyst.

CROSS-REFERENCE TO RELATED APPLICATION

This is a continuation-in-part application of application Ser. No. 583,407, filed on Sept. 30, 1966, now abandoned.

This invention relates to the catalytic conversion of petroleum hydrocarbon feedstocks. More particularly, it relates to a method for improving the physical properties of catalysts which are used for the conversion of petroleum hydrocarbon feedstocks.

Certain physical properties of hydrocarbon-conversion catalysts are important commercially. Such physical properties include the crushing strength of the catalyst and its resistance to abrasion. In commercial use, such catalysts must have sufficient strength and attrition resistance to withstand normal abuse which tends to produce fine catalyst particles, commonly referred to as fines. A buildup of these fines results in plugging of the catalyst bed and/or of the associated equipment. The buildup of such catalyst fines and the plugging of the catalyst bed and equipment promote costly shutdowns of the commercial equipment, which shutdowns are necessary to remove the restrictions and/or to screen the catalyst.

It is not uncommon for a catalyst which has an excellent activity for a particular hydrocarbon reaction to be impractical commercially because the catalyst possesses a low crushing strength. It is known that extruded catalysts tend to be softer than pelleted catalysts. These extruded catalysts, in most instances, may be prepared more cheaply than the pelleted catalysts, but their inferior physical properties preclude their use commercially. Therefore, in order to take advantage of the cheaper costs of preparation, a successful method for improving the physical properties of such hydrocarbon-conversion catalysts is needed. Such a method has been devised.

Broadly, in accordance with the invention, there is provided a method for improving the crushing strength and resistance to abrasion of a catalyst used for the conversion of petroleum hydrocarbon feedstocks. This method comprises incorporating into said catalyst a small amount of silica, which amount may fall within the range between about 1 weight percent and about 20 weight percent, based upon the weight of the catalyst. The silica may be incorporated into the catalyst just prior to the forming of thee catalyst into desired shapes, such as pellets of specified dimensions. The silica may also be incorporated by impregnation into the catalyst after the catalyst has been formed into the desired shapes. If the catalyst were already preformed, the silica can be impregnated into the finished material, after which the catalyst is dried and calcined.

The silica may be incorporated into the catalyst as a silica sol, or as an organo-silicate, such as ethylorthosilicate, or as an organo-silicone, such as silicone oil. Although organo-silicates or organo-silicones may be used, their volatility and greater degrees of impurities make them less desirable as a source of the silica to be used in this method for improving the physical properties of this catalyst. Preferably, the silica may be introduced into the catalyst as a silica sol.

A silica sol is a colloidal dispersion of surface-hydroxylated silica spheres in an aqueous medium, alkalized stabilized to introduce negative charges. It may be alkalized with ammonium hydroxide, sodium hydroxide, or any strong base. Stabilization with ammonium hydroxide is preferred, since it will not permanently poison a hydrocarbon-conversion catalyst. Such silica sols may be obtained commercially. An excellent example is the Ludox A. S. type silica sol, which is manufactured by E. I. du Pont and Company. Ludox A. S. type is an ammonia-stabilized silica sol containing solid particles having diameters of 14–15 millimicrons. Ludox A. S. type silica sol is preferred because such material is of high purity.

The silica may be added in an amount within the range between about 1 weight percent and about 20 weight percent, based upon the weight of the catalyst. Of course, the amount of silica required depends upon the type of catalyst that is to be improved. If the catalyst is a catalyst which has an alumina base, the amount of silica introduced therein probably should not exceed about 10 weight percent, based on the weight of the catalyst. On the other hand, if the catalyst is a silica-alumina catalyst, the amount of silica to be added could be limited by the ratio of the silica-to-the-alumina.

If the silica is to be introduced as a silica sol, the incorporation should be carried out at a temperature in excess of 32° F. At teemperatures below this value, an irreversible precipitation of the silica from the colloidal dispersion occurs. Introduction of the silica can be done conveniently at atmospheric pressure. If the silica is to be incorporated into preformed catalyst particles by impregnation, the impregnation can be carried out under a vacuum.

The disclosed method for improving the physical properties of a hydrocarbon-conversion catalyst may be used advantageously to enhance catalyst employed in such petroleum refining processes as reforming and hydrocracking.

Reforming is a general term which is applied to petroleum refining processes employed to increase the octane member of the various light hydrocarbon fractions wherein normal paraffins are isomerized to branched-chain paraffins, cyclopentate derivatives are isomerized to cyclohexane derivatives, alkyl-substituted cyclohexanes are dehydrogenated, certain paraffins are hydrocracked to lower-molecular-weight paraffins, and other paraffiins are dehydrocyclized to aromatics. Different types of reforming catalysts have been developed, each type of which may promote various combinations of these above-listed hydrocarbon-conversion reactions. A typical reforming catalyst is one which comprises a noble metal and a halogen supported on an active gamma-alumina or eta-alumina base.

Reforming operations are generally carried out with fixed catalyst beds. The process may be non-regenerative, semi-regenerative, or regenerative. Through the use of multiple reactors, one or more of which may be used as a swing reactor, continuous processing can be performed while a portion of the catalyst system is being regenerated. Because of frequent regeneration, that particular process may be operated at lower pressures. However, the alternating of streams of vaporous reactants with streams of regeneration gases, coupled with the intentional or accidental fluffing of a catalyst bed, tends to increase the amount of abrasion within the catalyst bed and to produce more catalyst fines. Consequently, a rugged catalyst is required.

Hydrocracking is a general term which is applied to petroleum refining processes wherein hydrocarbon feedstocks which have relatively high molecular weights are converted to lower-molecular weight hydrocarbons at elevated temperature and pressure in the presence of a hydrocracking catalyst and a hydrogen-containing gas. Hydrocracking processes have been developed to a point wherein hydrocarbon feedstocks containing relatively large nitrogen concentrations, 1,000 parts per million or greater, and relatively high sulfur concentrations can be treated conveniently.

Generally, low-temperature hydrocracking proceses for maximizing boiling-range products employ two processing stages. In the first stage, the feed-preparation stage, the feedstock is hydrotreated to remove nitrogen and sulfur that are found in the usual refinery feedstocks. In the second stage, the hydrocracking stage, the pretreated hydrocarbons are converted to lower-boiling products.

There are also one-stage hydrocracking processes. In a one-stage process, the denitrogenation and desulfurization occur in the first part of the catalyst bed or in the first reactor. Therefore, denitrogenation, desulfurization, and hydrocracking may be performed by the same catalyst in a one-stage process. But, two different catalysts may be used; the first catalyst, for the denitrogenation and desulfurization; the second catalyst, for the hydrocracking. Typically, ammonia and hydrogen sulfide formed with the first catalyst are passed over the second catalyst along with the hydrocarbons that are to be hydrocracked by the second catalyst. No separation step occurs between the first catalyst bed and the second catalyst bed, whereby the ammonia and hydrogen sulfide are separated from the hydrocarbon.

There are various types of hydrocracking catalysts. In general, they comprise a hydrogenation component on an acidic cracking component. Various hydrogenation components are available for use in hydrocracking catalysts. Such hydrogenation components possess hydrogenation-dehydrogenation activity and may exist in the elemental form. They may exist also as oxides or sulfides of the elements, or even as mixtures of the oxides and/or sulfides. The metallic members of the hydrogenation component may be selected from the metals of Group VI-B of the Periodic Table, for example, molybdenum and tungsten. They may be selected also from the metals of Group VIII of the Periodic Table, for example, cobalt, nickel, and platinum. The hydrogenation component can be introduced into the selected support by impregnating the support with a heat-decomposible compound, or compounds, of the selected dehydrogenation metal or metals. The resultant composite is then calcined.

Two catalysts are particularly preferred for hydrocracking of petroleum hydrocarbon feedstocks. One of these is a catalyst which comprises nickel, arsenic, and fluorine on a silica-alumina support. Such a catalyst is advantageously used in a two-stage hydrocracking process as the second-stage catalyst. The first-stage catalyst might conveniently be a catalyst comprising nickel-tungsten-sulfide on a silica-alumina base. The other catalyst is one comprising a mixture of the oxides of cobalt and molybdenum on a co-catalytic support comprising stabilized, decationized Y-type crystalline aluminosilicate zeolitic molecular sieves suspended in a porous matrix of amorphous silica-alumina. This catalyst may be used in a one-stage hydrocracking process. In such a catalyst, the amount of cobalt oxide may vary from about 2 weight percent to about 5 weight percent, based on the total catalyst weight; the amount of molybdenum trioxide, from about 4 weight percent to about 15 weight percent, based on total catalyst weight. The preferred amount of cobalt oxide is about 2.5 weight percent, based on total catalyst weight; that of molybdenum trioxide, about 5.0 weight percent, based on total catalyst weight. The preferred co-catalytic support comprises about 10 weight percent to about 12 weight percent molecular sieves suspended in the porous matrix of amorphous silica-alumina.

Certain commercially available, naturally-occurring and synthetic crystalline, aluminosilicate zeolitic molecular sieve materials are effective cracking components. In view of this, either naturally-occurring or synthetic molecular sieves may be used in a hydrocracking catalyst. Examples of naturally-occurring molecular sieves are erionite, mordenite, chabazite, faujasite, gmelinite, and the calcium form of analcite. Examples of synthetic crystalline, aluminosilicate zeolitic molecular sieves are X-type, Y-type, D-type, L-type, R-type, S-type, and T-type molecular sieves. The above crystalline aluminosilicate zeolitic molecular sieves can be activated by exchanging at least a portion of the alkali metals with protons or divalent metal ions and removing a major portion of the water of hydration that may be found therein. Characteristics of both naturally-occurring and synthetic molecular sieves and method for preparing them have been presented in the chemical art.

Decationized, Y-type crystalline aluminosilicate zeolitic molecular sieves may be advantageously used in hydrocracking catalysts. In such decationized molecular sieves, the sodium ions, as well as other alkali cations, may be removed by cation exchange with other ions to increase the number of acid sites available for cracking hydrocarbons. Such ions as hydrogen ions, ammonium ions, aluminum ions, calcium ions and ions of the rare earths may be used to replace as much as 90 percent of the alkali metal ions, and preferably more than 98 percent of the alkali metal ions.

Advantageously, a decationized Y-type crystalline aluminosilicate zeolitic molecular sieve may be suspended in a porous matrix to furnish a superior cracking support. The molecular sieves are dispersed or suspended in a porous matrix material formed by organic or inorganic compositions. Suitable inorganic oxides may be used for the matrix. These include alumina or amorphous silica-alumina. A low-alumina silica-alumina cracking catalyst is a typical matrix material. For such a base, the molecular sieves may be present in an amount between about 5 to about 30 weight percent, based on the weight of said catalyst support.

A catalyst may be prepared easily according to the present invention. A typical example concerns the preparation of a hydrocracking catalyst which comprises cobalt oxide and molybdenum trioxide deposited on a co-catalytic support comprising stabilized, decationized Y-type crystalline zeolitic molecular sieves suspended in a matrix of amorphous silica-alumina. The catalyst support which comprises a given percentage of decationized, Y-type crystalline aluminosilicate zeolitic molecular sieves suspended in the matrix of amorphous silica-alumina may be prepared by reducing the molecular sieve material to a small particle size and intimately admixing it with the silica-alumina. For example, the molecular sieves may be mixed with the silica-alumina while the silica-alumina is in the form of a clean hydrosol or a hydrogel. Subsequent to the mixing, the molecular-sieve-containing hydrosol or hydrogel is dried and formed into the desired shapes, such as pellets. The pellets may then be dried and/or calcined. Hydrogenation components may then be impregnated into the catalyst support particles through the use of solutions of suitable salts. In accordance with the present invention, the silica sol may be added advantageously to the molecular-sieve-containing hydrosol or hydrogel prior to drying. If the catalyst already exists as pellets, the silica sol may be added to the pellets prior to calcination, or in the alternative, it may be added to the pellets at the time the metals are incorporated into the pellets.

The following examples are presented to demonstrate that improved physical properties result when various catalysts are prepared according to the present invention.

These examples consider the preparation of catalysts other than the catalyst discussed in the above paragraph.

EXAMPLE I

In this example, a Sinclair-Baker eta-alumina reforming catalyst was employed. A colloidal dispersion of Ludox A. S. silica sol in water was prepared by mixing 27 grams of the sol in 120 ml. of distilled water. This colloidal dispersion was then used to impregnate 200 grams of the Sinclair-Baker catalyst. The catalyst was dried in flowing air at about 250° F. and subsequently calcined in air at 1,000° F. for about six hours. The rate of flowing air was maintained at about one cubic foot per hour. This impregnation resulted in the addition of about 4 weight percent silica to the catalyst.

Pellets of the Sinclair-Baker reforming catalyst prior to treatment with the silica sol were tested for crushing strength and for abrasion loss.

The crushing strength test was conducted as follows: a catalyst pellet was placed on its side between two parallel, horizontal plates, one stationary and one movable. A gradually increasing force was applied to the movable plate, perpendicular to the surface of the plate, until the pellet broke. That force, in pounds, which was applied at the instant the pellet broke, is considered as the crushing strength. The value for the crushing strength reported herein for a particular catalyst is the average value determined on at least 100 pellets or extrudates.

The test for loss by abrasion was conducted as follows: 100 grams of pelleted catalyst were charged to a metal cylinder having a height of six inches and a diameter of ten inches and containing one radial baffle, 5.5 inches in length. The radial baffle extended two inches from the side toward the axis of the cylinder. The cover for the cylinder was replaced and the cylinder was rotated horizontally on its axis for 30 minutes at 60 revolutions per minute. At the end of the test, the catalyst that had been charged was removed from the cylinder and passed through a 20-mesh screen. The material which remained on this screen was weighed. The difference between the weight in grams of the material remaining on the screen and the original 100 grams of catalyst charged to the cylinder is the amount of the catalyst loss by abrasion. Through the use of this value, the weight percent loss on abrasion can be calculated easily. Likewise, pellets of the catalyst after treatment with the silica sol were tested for their crushing strength and abrasion loss. Before treatment with the silica sol, the pellets possessed a crushing strength of 6.0 pounds; after treatment with the silica sol, a crushing strength of 9.4 pounds. Before treatment with silica sol, the pellets exhibited an abrasion loss of 4.0 percent; after treatment with the silica sol, an abrasion loss of 1.8 percent. The addition of the silica sol to the reforming catalyst improved both of the physical properties. It increased the crushing strength and lowered substantially the abrasion loss.

EXAMPLE II

In this example, a platinum reforming catalyst was treated with silica sol. The platinum-containing reforming catalyst consisted of 1/16-inch extrudates and was comprised of 0.8 weight percent platinum, 0.8 weight percent chloride on gamma-alumina. The aqueous solution of Ludox A. S. silica sol was prepared as in Example I. 200 grams of the reforming catalyst were then impregnated with 27 grams of the diluted silica sol. This provided 4 weight percent silica, based on total catalyst weight. The treated material was dried and calcined as described in Example I. As in Example I, catalyst before treatment with the silica sol and catalyst after treatment with the silica sol were tested for crushing strength and abrasion loss. Before treatment with the silica sol, the catalyst had a crushing strength of 3.4 pounds per mm. of catalyst length; after treatment with the silica sol, a crushing strength of 3.8 pounds per mm. of catalyst length. Before treatment with the silica sol, the catalyst possessed an abrasion loss of 1.7 percent; after treatment with the silica sol, an abrasion loss of 0.9 percent. Again, both the crushing strength and the abrasion loss were improved by employing the present invention.

EXAMPLE III

In this example, 1/16-inch extrudates of gamma-alumina were treated with silica sol. Again, 200 grams of this gamma-alumina were impregnated with the diluted Ludox silica sol as prepared in Example I. The treated material was dried and calcined as described in Example I. Samples of the gamma-alumina which were obtained prior to and subsequent to the treatment with the silica sol were tested for crushing strength and abrasion loss. Prior to the treatment, the gamma-alumina possessed a crushing strength of 1.5 pounds per mm. of catalyst length; after the treatment with silica, the gamma-alumina possessed a crushing strength of 2.4 pounds per mm. of catalyst length. Before treatment with the silica, the gamma-alumina possessed an abrasion loss of 5.3 percent; after treatment with the silica, an abrasion loss of 0.8 percent. Again, both the crushing strength and abrasion loss of this material were improved.

EXAMPLE IV

In this example, an extruded cobalt-molybdenum-on-alumina catalyst was used. This catalyst comprises 3 weight percent cobalt oxide, and 12.5 weight percent molybdenum trioxide deposited on gamma-alumina. 200 grams of this catalyst were impregnated with the diluted silica dispersion prepared as described in Example I. The treated material was then dried and calcined as described in Example I. Samples of the catalyst, both prior to and subsequent to the treatment with silica, were tested for crushing strength and abrasion loss. Prior to treatment with silica, the 1/16-inch extrudates possessed a crushing strength of 14.1 pounds; after treatment with silica, a crushing strength of 16.3 pounds. Prior to treatment with silica, the extrudates possessed an abrasion loss of 3.9 percent; after treatment with silica, an abrasion loss of 2.6 percent. As in the other examples, the crushing strength and the abrasion loss of the catalyst were improved when the catalyst was treated according to the present invention.

EXAMPLE V

In this example, a commercially prepared extruded platinum-containing reforming catalyst was treated with silica sol. The reforming catalyst comprised 0.8 weight percent platinum and 0.8 weight percent chloride on a gamma-alumina support and was in the form of 1/16-inch extrudates. A colloidal dispersion of Ludox A. S. silica sol in water, prepared by mixing 27 grams of the sol with 125 ml. of distilled water, was used to impregnate 200 grams of the reforming catalyst. The treated catalyst was dried in flowing air at a temperature of about 250° F. for about 2 hours and subsequently calcined in air at 1000° F. for about 6 hours. The flowing air was maintained at a rate of about 1.5 cubic feet per hour. This impregnation resulted in the addition of about 4 weight percent silica to the catalyst.

Samples of the reforming catalyst obtained prior to and subsequent to the treatment with the silica sol were tested for crushing strength and abrasion loss as described in Example I. Prior to the treatment, the reforming catalyst possessed a crushing strength of 1.3 pounds per mm of catalyst length; after the treatment with the silica-sol dispersion, the reforming catalyst possessed a crushing strength of 2.4 pounds per mm of catalyst length. Before treatment with the silica, the reforming catalyst possessed an abrasion loss of 4.2 weight percent; after treatment with the silica-sol dispersion, an abrasion loss of 0.5 weight percent. As in the previous examples, both the crushing strength and the abrasion loss of the catalyst were improved when the catalyst was treated according to the present invention.

EXAMPLE VI

In this example, a sample of the reforming catalyst employed in Example V prior to its treatment with the silica-sol dispersion was tested for its reforming ability. In addition, a sample of the reforming catalyst subsequent to treatment with the silica from Example V was tested for its reforming ability, and the performance of the two catalysts were compared to determine the effect of the impregnation of the silica into the reforming catalyst upon the activity of that catalyst.

Each of these tests was conducted in typical bench-scale test equipment, which employed a tubular stainless steel reactor and conventional product-recovery and analytical equipment. The reactor was 20 inches long and had an inside diameter of 0.622 inch. A catalyst charge of 20 grams of granular material which would pass through a 20-mesh U.S. Sieve, but not a 40-mesh U.S. Sieve, was employed. The catalyst was supported in the lower one-third of the reactor on a layer of 4 millimeter Pyrex glass beads. The volume of the reactor above the catalyst bed was empty. The catalyst bed occupied about 7 inches of reactor length. The desired reactor temperature was maintained by the use of a heated molten salt bath of Du Pont HITEC. Internal reactor temperatures were measured by means of an actual thermal couple.

Prior to its test, each catalyst received a pre-treat. This pre-treat comprised treating the catalyst first with air flowing at the rate of about 2 standard cubic feet per hour for 1 hour, purging the system by pressuring to 300 p.s.i.g. with nitrogen three times, and then treating the catalyst at a pressure of 300 p.s.i.g. and a temperature of about 900° F. for 1 hour with hydrogen flowing at the rate of 2 standard cubic feet per hour.

The hydrocarbon feedstock that was employed in each of these tests was a Mid Continent naphtha. Properties of this feedstock are presented in Table I.

TABLE I

Properties for Mid Continent naphtha

| | |
|---|---:|
| Gravity, ° API | 54.4 |
| ASTM distillation, ° F.: | |
| IBP | 170 |
| 10 vol. percent recovered | 223 |
| 30 | 249 |
| 50 | 276 |
| 70 | 308 |
| 90 | 352 |
| EBP | 394 |
| RON | 51.0 |
| Nitrogen, p.p.m. | 0.2 |
| Sulfur, p.p.m. | 5 |
| Mass spec. analysis, vol. percent | |
| Paraffins | 47.1 |
| Naphthenes | 40.8 |
| Aromatics | 12.1 |
| Gas chromatography, HCTA vol. percent: | |
| Paraffins+naphthenes | 88.6 |
| Aromatics | 11.4 |
| Benzene | 0.4 |
| Toluene | 2.0 |
| Ethylbenzene | 0.5 |
| M- and p-xylene | 1.9 |
| o-Xylene | 0.7 |

Each of the tests was conducted at the following nominal operating conditions: a molten salt bath temperature of about 900° F.; an average catalyst bed temperature of about 895° F.–900° F.; a pressure of about 300 p.s.i.g.; a hydrogen addition rate of about 5,000 standard cubic feet of hydrogen per barrel of feedstock (s.c.f.b.); and a weight hourly space velocity (WHSV) of about 2.28 grams of feedstock per hour per gram of catalyst.

Each of the catalysts was tested for two periods on stream. A sample of the product was obtained at the end of each period. The first sample was taken after 21 hours on stream and the second after 48 hours on stream. Samples of the gaseous and liquid products were analyzed by gas chromatography. The analytical results were reported on a total hydrocarbon basis. A sample of the liquid product from each test period was submitted for an unleaded research octane number (RON). A relative activity was then calculated for each test period.

The results of these tests are presented in Table II. The analysis of each product, the unleaded research octane number (RON) and the relative activity associated with that product are provided in this Table II.

TABLE II.—REFORMING RESULTS

| | Catalyst | | | |
|---|---|---|---|---|
| | Untreated | | Silica-treated | |
| Period | 1 | 2 | 1 | 2 |
| Total hydrocarbon product, wt. percent: | | | | |
| $C_1$ | 0.87 | 0.76 | 0.91 | 0.69 |
| $C_2$ | 1.15 | 1.20 | 1.34 | 1.09 |
| $C_3$ | 2.50 | 2.80 | 2.86 | 2.44 |
| $IC_4$ | 1.16 | 0.94 | 1.26 | 1.17 |
| $nC_4$ | 2.04 | 1.52 | 1.78 | 1.78 |
| $IC_5$ | 2.26 | 2.00 | 2.02 | 1.93 |
| $nC_5$ | 1.36 | 1.13 | 1.38 | 1.20 |
| Neo $C_6$ | 0.29 | 0.22 | 0.21 | 0.15 |
| $C_6$ | 5.56 | 4.93 | 5.27 | 4.50 |
| MCP+ | 0.89 | 0.87 | 0.84 | 0.61 |
| Benzene | 3.16 | 2.87 | 3.52 | 3.05 |
| $C_7$ | 10.65 | 10.27 | 10.30 | 10.57 |
| Toluene | 14.75 | 14.85 | 15.99 | 15.52 |
| $C_8$ sat | 5.31 | 5.36 | 4.70 | 5.36 |
| $C_8$ AR | 19.15 | 19.15 | 19.67 | 19.54 |
| $C_9$+ | 28.60 | 31.20 | 27.95 | 30.42 |
| Percent recovery | 94.9 | 93.2 | 93.2 | 93.1 |
| Average catalyst bed temperature, ° F | 894 | 899 | 897 | 899 |
| RON octane | 94.1 | 95.1 | 94.6 | 95.2 |
| Relative activity | 99 | 99 | 98 | 101 |
| $C_5$+ yield, wt. percent | 92.3 | 92.8 | 91.9 | 92.8 |

The results, as presented in Table II, indicate that the reforming performance of the catalyst prior to treatment with silica is equivalent to the reforming performance of the catalyst that has been treated with the silica to improve its crushing strength and resistance to abrasion. Within the accuracy of these tests, the resultant hydrocarbon products are equivalent, the activities are equivalent, and the $C_5$+ yields are equivalent. Hence, the treatment of the catalyst with the silica-sol dispersion would not deleteriously affect the activity and selectivity of the catalyst.

The silica particles in Ludox A. S. are relatively large compared to the pores that are to be found in reforming catalyst extrudates. The particle size of Ludox A. S. silica is about 14 to 15 millimicrons. A typical average pore diameter for this type of reforming catalyst is about 8–9 millimicrons. Therefore, one skilled in the art would expect the particle of silica to block pores in the reforming catalyst, thereby occluding active catalyst sites. However, the results of these tests show unexpectedly that the impregnation of the reforming catalyst with the silica-sol dispersion in no way deleteriously affects the catalyst activity and selectivity for reforming petroleum hydrocarbons.

EXAMPLE VII

In this example, commercially prepared 1/16-inch gamma-alumina extrudates were simultaneously impregnated with chloroplatinic acid and with Ludox A. S. silica sol. The solution that was employed for the impregnation was prepared by first dissolving 2.0 grams of chloroplatinic acid, $H_2PtCl_6$, and 2.0 grams of aluminum nitrate in 50 ml. of distilled water and then combining the resulting solution with 13.4 grams of Ludox A. S. silica sol that had been diluted with 50 ml. of distilled water. The impregnated alumina was then dried in flowing air at a temperature of about 250° F. for about 2 hours and subsequently calcined in air at a temperature of about 1000°

F. for about 3 hours. The flowing air was maintained at a rate of about 1.5 cubic feet per hour.

Samples of the alumina prior to and subsequent to the impregnation were tested for crushing strength and abrasion loss as described in Example I. Prior to the impregnation, the alumina possessed a crushing strength of 1.5 pounds per mm. of extrudate length; after the impregnation, the alumina extrudate possessed a crushing strength of 2.2 pounds per mm. of extrudate length. Before the impregnation, the alumina extrudates possessed an abrasion loss of 5.3 weight percent; after the impregnation, an abrasion loss of 0.5 weight percent. As has been noted in previous examples, both the crushing strength and the abrasion loss were improved. This is so, even though the dehydrogenation component was impregnated into the alumina at the same time as the silica.

EXAMPLE VIII

In this example, a sample of the catalyst prepared in Example VII by the impregnation was tested for its reforming ability. The results of this test are presented in Table III and are compared to those obtained with the reforming catalyst of Example VI that had not been treated with silica sol (the same data shown for period 1 of the untreated catalyst in Table II).

TABLE III.—REFORMING RESULTS

| | Catalyst | |
|---|---|---|
| | Untreated | Treated simultaneously with silica and Pt |
| Total Hydrocarbon Product, wt. percent: | | |
| $C_1$ | 0.87 | 0.73 |
| $C_2$ | 1.15 | 1.16 |
| $C_3$ | 2.50 | 2.62 |
| $i\text{-}C_4$ | 1.16 | 1.32 |
| $n\text{-}C_4$ | 2.04 | 1.84 |
| $i\text{-}C_5$ | 2.26 | 1.84 |
| $n\text{-}C_5$ | 1.36 | 1.24 |
| Neo-$C_6$ | 0.29 | 0.24 |
| $C_6$ | 5.56 | 4.64 |
| MCP+ | 0.89 | 0.73 |
| Benzene | 3.16 | 3.21 |
| $C_7$ | 10.65 | 10.00 |
| Toluene | 14.75 | 15.97 |
| $C_8$-saturates | 5.31 | 4.81 |
| $C_8$-aromatics | 19.15 | 19.94 |
| $C_9+$ | 28.60 | 29.70 |
| Percent recovery | 94.9 | 94.0 |
| Average catalyst bed temperature, °F | 894 | 902 |
| RON | 94.1 | 96.1 |
| Relative activity | 99 | 118 |
| $C_5+$ yield, wt. percent | 92.3 | 92.3 |

The results presented in Table III indicate that simultaneous impregnation of the alumina support with the platinum dehydrogenation component and the silica did not deleteriously affect either the relative activity of the catalyst or the $C_5+$ yield produced. It is quite evident that the simultaneous impregnation did not appreciably interfere with the dispersion of the platinum throughout the catalyst support.

The above examples are presented for purpose of illustration only, and are not intended to limit, in any way, the disclosed method of improving physical properties of hydrocarbon-conversion catalysts. These examples show that both extruded catalysts and pelleted catalysts may have their physical properties improved by the present invention.

What is claimed is:

1. A method for improving the crushing strength and resistance to abrasion of a catalyst used for the conversion of petroleum hydrocarbon feedstocks, which method comprises impregnating into said catalyst after the forming of said catalyst into desired shapes silica in an amount between about 1 weight percent and about 20 weight percent, based upon the weight of said catalyst, to form a silica-impregnated catalyst, drying and calcining in air said silica-impregnated catalyst.

2. The method of claim 1 wherein said silica is impregnated into said catalyst at a pressure which is less than 1 atmosphere.

3. The method of claim 1 wherein said silica is incorporated into said catalyst as a silica sol, said incorporating being carried out at a temperature in excess of 32° F.

4. The method of claim 3 wherein said incorporating is carried out at atmospheric pressure.

5. A method for improving the crushing strength and resistance to abrasion of a catalyst used in the reforming of petroleum hydrocarbon feedstocks, said catalyst comprising about 0.1 weight percent to about 2.0 weight percent platinum and about 0.1 weight percent to about 2.0 weight percent chloride on an alumina support, which method comprises impregnating into said catalyst after the forming of said catalyst into desired shapes silica in an amount between about 1 weight percent and about 20 weight percent, based upon the weight of said catalyst, to form a silica-impregnated catalyst, drying and calcining in air said silica-impregnated catalyst.

6. The method of claim 5 wherein an amount of about 4 weight percent silica is incorporated into said catalyst.

7. The method of claim 5 wherein said silica is incorporated into said catalyst as a silica sol, said incorporating bieng carried out at a temperature in excess of 32° F.

References Cited

UNITED STATES PATENTS

| 2,941,958 | 6/1960 | Connor et al. | 252—454X |
| 3,173,857 | 3/1965 | Haensel | 252—460X |

DANIEL E. WYMAN, Primary Examiner

C. F. DEES, Assistant Examiner

U.S. Cl. X.R.

252—449, 455, 460